United States Patent [19]

Hogeboom et al.

[11] Patent Number: 4,650,930
[45] Date of Patent: Mar. 17, 1987

[54] ADAPTIVE EQUALIZER

[75] Inventors: John G. Hogeboom; Terry N. Thomas, both of Nepean, Canada; Dennis A. Yarak; Arlan J. Anderson, both of Palo Alto, Calif.

[73] Assignee: Northern Telecom Limited, Montreal, Canada

[21] Appl. No.: 701,287

[22] Filed: Feb. 13, 1985

[51] Int. Cl.⁴ ............................................. H04M 11/00
[52] U.S. Cl. ........................................ 379/93; 375/14; 375/101; 379/411
[58] Field of Search ................ 179/2 DP; 375/12, 14, 375/18, 101; 333/18

[56] References Cited

U.S. PATENT DOCUMENTS 4,545,060 10/1985 Arnon ..................................... 375/14

FOREIGN PATENT DOCUMENTS 48475 3/1982 European Pat. Off. ......... 179/2 DP
2117606 10/1983 United Kingdom ............. 179/2 DP Primary Examiner—Keith E. George
Attorney, Agent, or Firm—Schwartz, Jeffery, Schwaab, Mack, Blumenthal & Evans

[57] ABSTRACT

High-speed bipolar signals transmitted along standard twisted pair telephone wiring are subject to InterSymbol Interference which is corrected by an equalizer circuit that is operably responsive to predetermined parameters of bipolar signals detected at the secondary of a line transformer. These parameters are input to a control logic circuit which includes several stages, each producing a set of past dependent logical control signals which are input to corresponding equalizer tap circuits having outputs connected to a common output bus. Each tap circuit includes an integrator that is incrementally charged and discharged by an electronically switched capacitor. A tap weight voltage output from each integrator is subsequently summed directly or inversely by a second switched capacitor under control of the logical input signals. And, an equalizing signal output from the second capacitor is coupled through a buffer amplifier to the line transformer where it is added to the incoming signal and allows eye diagram monitoring directly at the transformer.

14 Claims, 3 Drawing Figures

ADAPTIVE EQUALIZER

FIELD OF THE INVENTION

This invention relates to a telephone line equalizer and more particularly to an adaptive equalizer that is operably responsive to varying dynamics of a telephone line.

BACKGROUND OF THE INVENTION

User demand has demonstrated a need for increasingly higher speed digital access in new office communication controllers as daily routines become more complex and greater demands are placed on improving productivity. Current Local Area Network (LAN) solutions that provide this higher speed are beset by high cost and congestion. Moreover, these solutions are usually poorly suited to integrating voice services.

An alternative to the traditional LAN approach is to integrate all voice and data services into a centralized controller and to utilize inexpensive standard in-building twisted pair wiring to provide the required interconnects. A commonly experienced problem in this approach is the restriction to low baud rates for transmission. Notwithstanding the limited transmission capability of standard twisted pair wiring, a viable centralized controller is expected to execute both ends of a 2.56 Mb/s digital line interface over such wiring.

Under these circumstances a common requirement is to equalize for InterSymbol Interference (ISI) which is caused by the bandwidth restrictions of the twisted pair wiring. Other line conditions may occur, however, which complicate the achievement of adequate equalization. Further complications arise as a result of ISI being adversely affected by both static and dynamic conditions. Mixed wire gauges, for example, constitute a static condition that may be compensated through fixed equalization. However, imperfect pre-equalization of line signals and itinerant bridged tap connections, which may also be transient, on the line present substantial problems in line equalization.

SUMMARY OF THE INVENTION

Accordingly, a principal object of the present invention is to provide an adaptive equalizer that reduces ISI by providing immunity from changing transmission characteristics of a telephone line that result from the use of different wire gauges and insulation types, imperfect pre-equalization, and bridged tap connections.

Another provision of the invention is an adaptive equalizer that is operable with an interface over standard twisted pair wiring at transmission rates up to at least 2.56 Mb/s.

Still another provision of the invention is an adaptive equalizer having an output that is connectable to a balanced output from a telephone line transformer which allows eye monitoring directly at the transformer.

Yet another provision of the invention is an adaptive equalizer that will correct for residual signal or echo effects a predetermined number of bits following the arrival of a principal pulse representing a positive or negative bit.

The problems associated with the prior art may be substantially overcome and the foregoing objectives achieved by recourse to the present invention which relates to an adaptive equalizer that is connectable to a balanced output from a telephone line transformer for correcting InterSymbol Interference in a stream of bipolar signals carried on the line. The equalizer comprises control logic means having a plurality of inputs responsive to predetermined parameters of detected bipolar signals for producing a first set of past dependent logical control signals, tap means operably responsive to the control signals for generating a predetermined equalizing output signal, and coupling means connected to the tap means for applying the equalizing signal to the balanced output.

BRIEF DESCRIPTION OF THE DRAWINGS

The invention will now be more particularly described with reference to an embodiment thereof shown, by way of example, in the accompanying drawings in which.

DESCRIPTION OF THE PREFERRED EMBODIMENT

Figure 1:
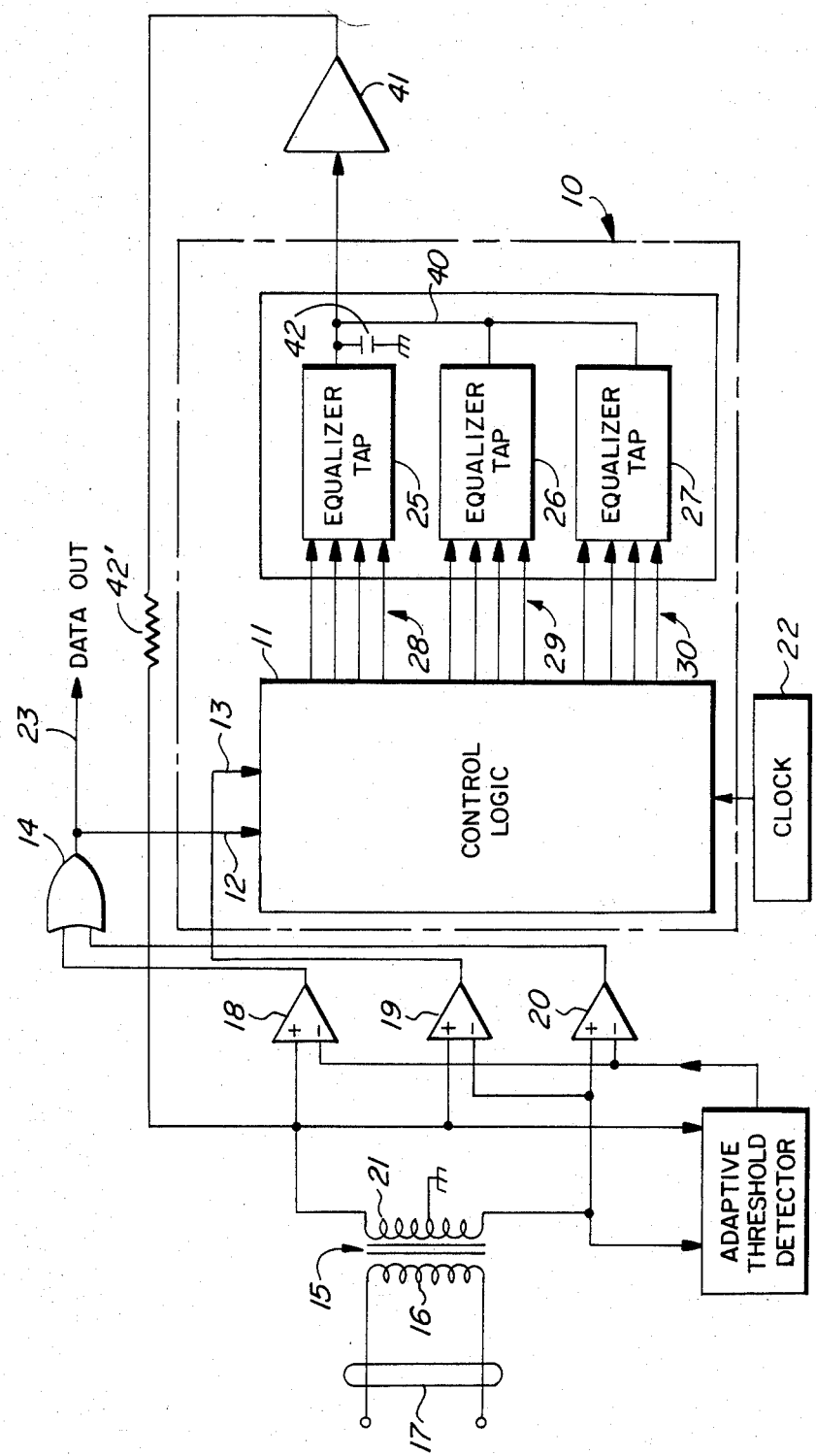
FIG. 1 is a block diagram of an adaptive equalizer according to the present invention shown connected to a telephone line transformer.

A block diagram of an adaptive equalizer 10 is shown in FIG. 1. The equalizer 10 includes a control logic circuit 11 having two inputs 12 and 13 which are coupled to a balanced output of a telephone line transformer 15. A primary winding 16 of the transformer is connected to a telephone line which is shown as a standard twisted pair 17. Three differential amplifiers, 18, 19 and 20 each have inputs coupled to a secondary winding 21 of the transformer 15 in order to detect incoming bipolar signals and to ascertain predetermined parameters therefrom. Thus, the amplifier 18 produces an output which reflects each logical positive pulse input from the twisted pair 17 and applies the output to the input 12 via an OR gate 14. The amplifier 19 is used to determine the sign of the incoming bipolar signal and to produce a corresponding output that is applied to the input 13. Finally, the amplifier 20 detects each logical negative pulse input from the twisted pair 17 and applies a corresponding output to the input 12 via the OR gate 14.

A third input to the circuit 11 comprises timing pulses CLK and $\overline{\text{CLK}}$ generated by a clock 22.

In addition to providing an output signal to the input 12, the OR gate 14 also provides a data output 23 which is available for further processing as in a centralized controller (not shown).

It will be observed in FIG. 1 that the equalizer 10 further includes three equalizer taps 25, 26 and 27, each of which have four inputs 28, 29 and 30 that are connected to corresponding outputs of the control logic circuit 11.

The operation of each equalizer tap is identical except for the control logic connections at the inputs 28, 29 and 30 which differ depending on the particular equalizer tap to which a set of past dependent logical control signals are applied as hereinafter described. Under control of these signals, each equalizer tap is responsible for correcting the residual signal or echo effects of ISI a predetermined number of bit times after the arrival of a main pulse representing a positive or a negative bit. According to the present circuit arrangement, the tap 25 corrects for the residual or echo one bit time after the main pulse is received whereas the tap 26 makes this correction two bit times after receiving the main pulse and the tap 27 makes a similar correction three bit times after receiving the main pulse. The order of significance of weighting produced by the various equalizer taps is such that the tap 25 is the most significant whereas the tap 27 is the least significant.

Respective outputs from the equalizer taps are connected to an output bus 40 and therefrom to the input of a buffer amplifier 41. It will be observed in FIG. 1 that a smoothing capacitor 42 is connected between the bus 40 and a ground reference for holding the output voltage appearing on the bus 40 substantially constant. This function will be described in further detail in the circuit description to follow.

The amplifier 41 provides a high input impedance to buffer the bus 40 and generates an equalizing output signal that is applied through a current limiting resistor 42' to one side of the winding 21 so as to be added to the incoming signal voltage. This circuit arrangement allows eye diagram monitoring directly at the transformer 15.

The basic functions performed by the equalizer 10 will next be described with reference to the circuit of the tap 25 shown in FIG. 3. In the interest of brevity, only one equalizer tap circuit will be described which, as previously noted, is representative of each equalizer tap in the equalizer 10. Two principal functions are performed by the tap 25. Firstly, one bit after the arrival of each detected positive or negative pulse at the input 12 (FIG. 1), an equalizing output pulse of opposite sign is generated at an output 45 which is connected to the bus 40. The equalizing output signal is proportional to a tap weight voltage. that is held on an integrator 46. Secondly, based on an error voltage when a zero input signal is received at the input 12 and the tap 25 generates an output and all or more significant taps are not generating an output, a tap weight voltage output from the integrator 46 is incrementally adjusted in a direction which will serve to reduce the error voltage towards zero.

Figure 2:
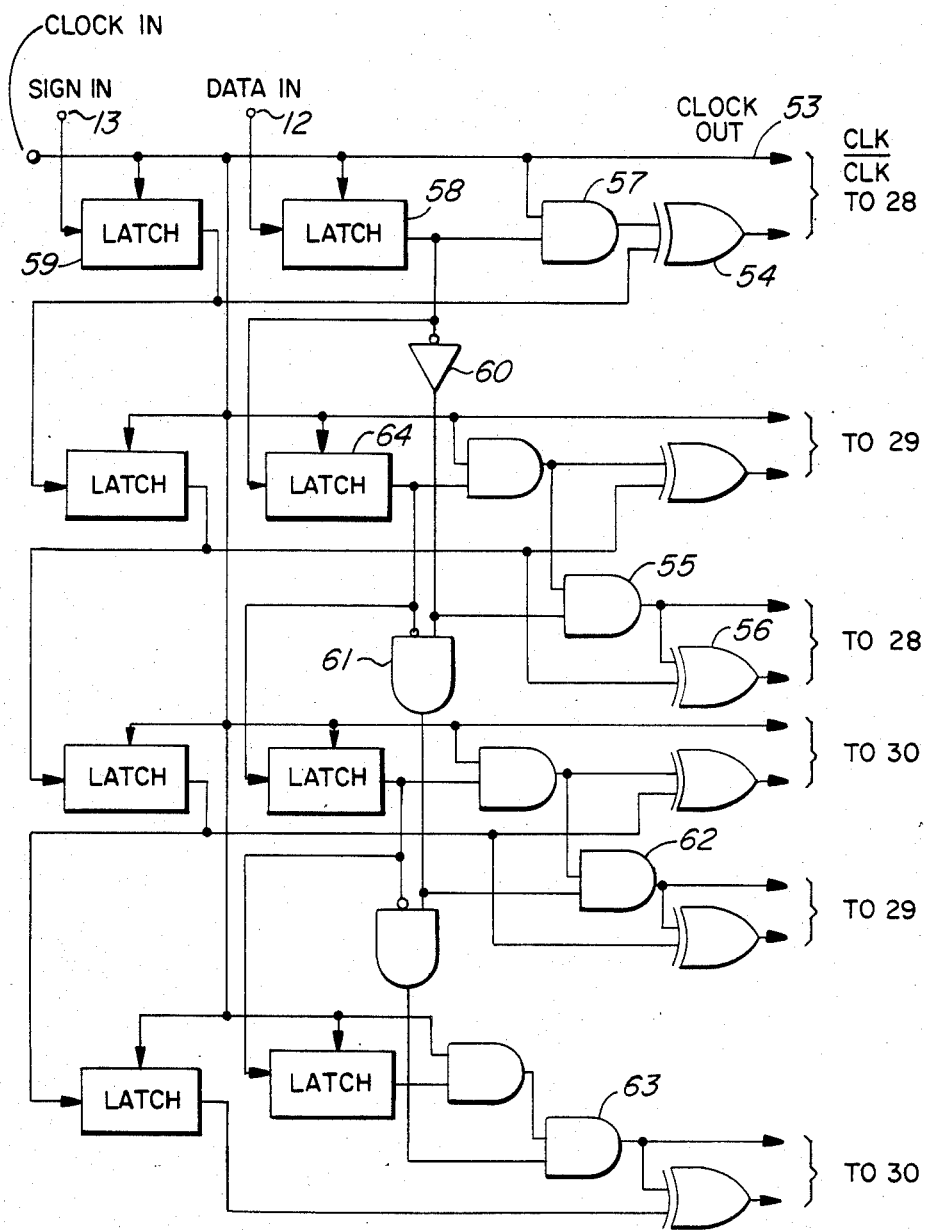
FIG. 2 is a schematic diagram of a control logic circuit in the equalizer of FIG. 1.
Figure 3:
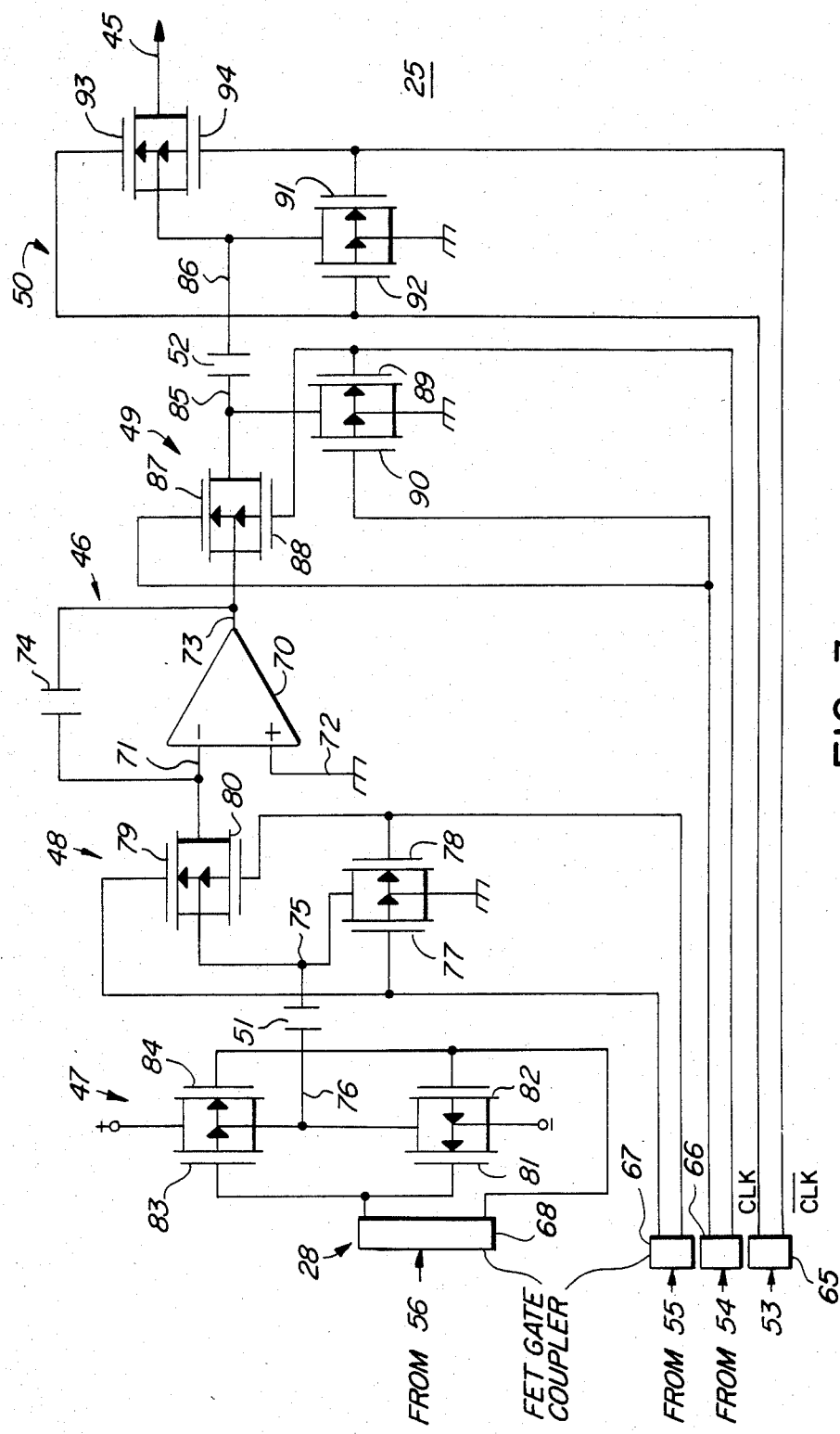
FIG. 3 is a schematic diagram of an equalizer tap in the diagram of FIG. 1.

The purpose of the control logic circuit 11 (FIG. 2) is to operate Field Effect Transistor (FET) switches 47, 48, 49 and 50 which function to switch capacitors 51 and 52 in the circuit arrangement of FIG. 3 to generate either negative or positive output pulses at appropriate times to either increment or decrement the integrator 46. In addition, the control logic circuit 11 stores sets of past dependent logical control signals, including data and sign for the bipolar coding assumed, which provide control signal inputs into respective equalizer taps to control the times during which the incrementing and decrementing pulses are generated.

Having regard to FIG. 3, it will be observed that the input 28 comprises four outputs from the control logic circuit 11, namely a clock output 53, an output from an Exclusive OR gate 54, an output from an AND gate 55, and a fourth output from an Exclusive OR gate 56. Each one of these outputs is connected via a respective FET gate coupler 65, 66, 67, 68 to complementary pairs of gates in the switches 47, 48, 49 and 50 as hereinbelow described.

An AND gate 57 has one input connected to the output 53 and a second input connected to an output of a latch 58, which, in turn, has inputs from the output 53 and the input 12. The gate 57 determines when a one was received one bit earlier (n bits earlier for the following control logic stages) to toggle the gate 54 positive or negative depending on the sign input to the gate 54 from a latch 59. This causes the output from the gate 56 to toggle at the same time provided the previous more significant taps are not active. In the present description, the tap 25 is the most significant one responsible for the sign being what it is, therefore there is no tap that is more significant in the case of the tap 25. The output from the gate 56 is also switched simultaneously with the output from the gate 54, again with the direction controlled by the sign.

An inverter 60 in a first stage of the control logic circuit 11 is shown with its input connected to the output of the latch 58. The output from the inverter 60 is applied to one input of an AND gate 61 in a following control logic stage as well as to one input of an AND gate 55 thereof. The output from the inverter 60 is understood to be past dependent since it depends on data stored in the latch 58. Correspondingly, the output from the gate 61 which is applied to one input of an AND gate 62 in a further control logic stage is likewise past dependent. Moreover, a second input to a negative input of the gate 61 is derived from the output of a latch 64 which receives, as one input, the stored output of the latch 58. In this manner, respective sets of past dependent logical control signals are output from the various control logic stages to the equalizer tap inputs 28, 29 and 30.

Referring next to FIG. 3, it will be observed that the integrator 46 comprises an amplifier 70 having a signal input 71, a grounded reference input 72 and an output 73 that is coupled back to the input 71 via a large integrating capacitor 74. A voltage at the output 73 represents the tap weight and is held constant via the amplifier 70 and the capacitor 74.

Small increments of charge from the capacitor 51, which is substantially smaller, may be added to or subtracted from the charge on the capacitor 74 via the switches 47 and 48. Accordingly, each time the control logic circuit 11 determines that a connection is needed, a terminal 75 of the capacitor 51 is connected from ground reference to the input 71 and the other terminal 76 is switched from either a positive or a negative terminal of a source of direct current voltage depending on the sign of the needed correction.

An appropriate switching configuration is determined by the outputs from the gates 55 and 56 which are connected to respective gates of the switches 48 and 47 via the couplers 67 and 68. In the case of the switch 48, a P channel FET 77 and its complementary N channel FET 78, which is connected in parallel, are switched off to lift the terminal 75 from ground reference. Correspondingly, an N channel FET 79 and a parallel connected complementary P channel FET 80 are switched on to connect the terminal 75 to the input 71.

Similarly, a complementary pair of N channel and P channel FETs 81 and 82 alternately switch with a complementary pair of P channel and N channel FETs 83 and 84 under control of the output from the gate 56. The order of switching is such that the switch 47 is switched to its required state prior to the operation of the switch 48. Afterwards, both switches 47 and 48 are operated simultaneously.

Summing of the tap weight voltage at the output 73 occurs via the capacitor 52 of which a terminal 85 thereof is alternately switched between the output 73 and ground reference synchronously with the other terminal 86 of the capacitor being switched alternately between ground reference and the output 45. Thus, when the terminal 85 is switched from ground reference to the output 73 in step with the terminal 86 from ground reference to the output 45 summing of the tap weight voltage occurs. Conversely, an inverse tap weight voltage is summed if the terminal 85 is switched from the output 73 to the ground reference in step with the terminal 86 switched from the output 45 to ground reference. As indicated in FIG. 3, the terminal 85 is alternately switched to the output 73 by means of an N channel FET 87 connected in parallel with a complementary P channel FET 88, the gates of which are coupled to the output of the gate 54 for switching control. Alternate switching of the terminal 85 to and from ground reference is performed by an N channel FET 89 connected in parallel with a complementary P channel FET 90 as shown in the figure.

Unlike the other FET switches, the switch 50 alternates the connection of the terminal 86 from ground reference to the output 45 at a rate established by the clock 22. In this regard, it will be observed that the terminal 86 is alternately connected and disconnected from ground reference by an N channel FET 91 connected in parallel with a complementary P channel FET 92, the respective gates of which are connected to the output 53. A similar arrangement of an N channel FET 93 in parallel with a complementary P channel FET 94 alternately connects and disconnects the terminal 86 relative the output 45 under the control of clock pulses from the output 53. Between the switched intervals of the switch 50, the capacitor 42 functions to maintain the voltage at the output 45 substantially constant.

It will be apparent to those skilled in the art to whom this specificiation is addressed that the embodiment heretofore described may be varied to meet specialized requirements without departing from the true spirit and scope of the invention disclosed. As an example, an adaptive equalizer has been described which employs three equalizer taps to effect corrective weighting. This embodiment, however, is representative of an adaptive equalizer that is not necessarily limited to a particular number of taps. Furthermore, although a control logic circuit is shown in which various stages thereof employ two latches that form part of a shift register, the circuit is not necessarily restricted to latches and other forms of storage may be used to store the required previous decisions output from the latches. Accordingly, the described embodiment should not be taken as indicative of the limits of the invention but rather as an exemplary structure thereof which is described by the claims appended hereto.

The embodiments of the invention in which an exclusive property or privilege is claimed are defined as follows:

1. An adaptive equalizer connectable to a balanced output from a telephone line transformer for correcting InterSymbol Interference in a stream of bipolar signals carried on the line, comprising:
    control logic means having a plurality of inputs responsive to predetermined parameters of detected bipolar signals for producing a first set of past dependent logical control signals;
    tap means operably responsive to the control signals for generating a predetermined equalizing output signal comprising one or more weighting circuits each including: integrator means having an input and an output, a tap weight signal generator comprising a first capacitor switchable between selected poles of a source of direct current voltage and connected to the integrator means input for generating corresponding positive and negative pulses to selectively increment or decrement a voltage output of the integrator means, and a summing means comprising second capacitor selectively switchably connected to the integrator means output and connected to an output of the tap means for summing the integrator means output voltage to form the equalizing signal; and
    coupling means connected to the output of the tap means for applying the equalizing signal to the balanced output.

2. An equalizer as claimed in claim 1, further comprising means for generating and temporarily storing at least one subset of past dependent control signals corresponding to the first set of control signals and means responsive to each stored subset of control signals and to one of the parameters for producing subsequent corresponding sets of past dependent control signals.

3. An equalizer as claimed in claim 2 wherein the tap means comprises a plurality of said weighting circuits controlled by the first set of control signals and the at least one set of past dependent control signals, and a common output bus from the weighting circuits connected to the coupling means.

4. An equalizer as claimed in claim 3 wherein the integrator comprises an operational amplifier having an output, a reference input connected to a ground reference and a signal input, and a third capacitor connected between the output and the signal input.

5. An equalizer as claimed in claim 4 wherein the tap weight signal generator further comprises:
    first switch means adapted to selectively connect one terminal of the first capacitor between a positive and a negative pole of said source of direct current voltage in response to a first predetermined control signal; and
    second switch means adapted to selectively connect the other terminal of the first capacitor between the ground reference and the signal input of the operational amplifier.

6. An equalizer as claimed in claim 5 wherein the summing circuit further comprises:
    third switch means adapted to selectively connect one terminal of the second capacitor between the ground reference and the output of the operational amplifier; and
    fourth switch means adapted to selectively connect the other terminal of the second capacitor between the ground reference and the output bus.

7. An equalizer as claimed in claim 6 further comprising a smoothing capacitor connected between the ground reference and the output bus for holding the equalizing output signal substantially constant during switching intervals of the fourth switch means.

8. An equalizer as claimed in claim 7 wherein the predetermined parameters of the detected bipolar signals comprise, the sign of each bipolar signal, data corresponding to the bipolar signals and each zero received.

9. An equalizer as claimed in claim 8 wherein the coupling means comprises a buffer amplifier having an input connected to the output bus and an output serially connected with a predetermined fixed resistor to the balanced input so as to add the equalizing signal to the incoming bipolar signals.

10. An equalizer as claimed in claim 9 wherein the control logic means comprises:

a first latch adapted to store signals corresponding to the sign of individual ones of the bipolar signals input thereto;

a second latch adapted to store signals corresponding to data represented by individual ones of the bipolar signals input thereto; and first gate means responsive to separate outputs from the latches and to signals corresponding to each zero signal input thereto for producing the first set of control signals.

11. An equalizer as claimed in claim 10 wherein the means for generating and temporarily storing at least one subset of past dependent control signals comprises:

a third latch adapted to store the output from the first latch;

a fourth latch adapted to store the output from the second latch; and second gate means responsive to separate outputs from the third and fourth latches and to a first past dependent output from the second latch for generating the at least one subset of control signals.

12. An equalizer as claimed in claim 11 wherein the means responsive to each stored subset of control signals and to one of the parameters for producing a subsequent corresponding set of past dependent control signals comprises:

a fifth latch adapted to store the output from the third latch;

a sixth latch adapted to store the output from the fourth latch; and third gate means responsive to separate outputs from the fifth and sixth latches and to a second past dependent output from the second and fourth latches for producing a subsequent set of control signals.

13. An equalizer as claimed in claim 12 wherein the means responsive to each stored subset of control signals and to one of the parameters for producing a subsequent corresponding set of past dependent control signals further comprises:

a seventh latch adapted to store the output from the fifth latch;

an eighth latch adapted to store the output from the sixth latch; and fourth gate means responsive to separate outputs from the seventh and eighth latches and to a third past dependent output from the second, fourth and sixth latches for producing a subsequent set of control signals.

14. An equalizer as claimed in claim 13 wherein individual ones of the switch means comprise a pair of P channel and complementary N channel Field Effect Transistors operably connected in parallel between each pair of switching points.

* * * * *